United States Patent [19]

Baukema et al.

[11] Patent Number: 5,102,954
[45] Date of Patent: Apr. 7, 1992

[54] LOW FORMALDEHYDE POLYACETAL CONTAINING COATING

[76] Inventors: Paul R. Baukema, 4205 Stivers Ct., Louisville, Ky. 40207; Milton J. Kaelin, 2614 Waterford Rd., Mt. Washington, Ky. 40047; Donald W. Waltrip, 78 Park Ave., Shepherdsville, Ky. 40165; Kenneth M. Znidersic, 613 Plainview Terrace Dr., Louisville, Ky. 40223

[21] Appl. No.: 612,261

[22] Filed: Nov. 9, 1990

[51] Int. Cl.$^5$ ............................................. C08K 5/07
[52] U.S. Cl. .................................. 525/154; 525/418; 525/472
[58] Field of Search ................... 525/154, 418, 472

[56] References Cited

U.S. PATENT DOCUMENTS

| | | | |
|---|---|---|---|
| 4,002,699 | 1/1977 | Labana et al. | 525/155 |
| 4,079,100 | 3/1978 | Gergen et al. | 525/154 |
| 4,100,137 | 7/1978 | Lemieux et al. | 525/154 |
| 4,297,448 | 10/1981 | Chang et al. | 525/154 X |
| 4,351,916 | 9/1982 | Kohan | 525/154 X |
| 4,535,127 | 8/1985 | Matsuzaki et al. | 524/154 |
| 4,670,508 | 6/1987 | Ohdaira et al. | 525/154 X |
| 4,814,397 | 3/1989 | Novak | 525/154 |
| 4,873,282 | 10/1989 | Yui et al. | 525/154 |
| 5,011,890 | 4/1991 | Novak | 525/154 |

Primary Examiner—Joseph L. Schofer
Assistant Examiner—J. M. Reddick
Attorney, Agent, or Firm—Donald L. Cox; Scott R. Cox

[57] ABSTRACT

The instant invention involves a process for forming a low formaldehyde, essentially color-free coating composition by applying the composition preferably to a wood substrate and curing. The composition comprises a blend of a polyhydroxy-containing polymer, an hexaalkoxymethylolmelamine, a polyacetal having the formula:

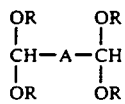

wherein R is $C_1$-$C_3$ and A is $C_1$-$C_{20}$ allyl or aryl and an acid catalyst. The coating compositions of the instant invention exhibit extremely low color and give off a significantly reduced amount of formaldehyde when cured in comparison to conventional prior art, acid catalyzed melamine/formaldehyde cured coatings.

7 Claims, No Drawings

LOW FORMALDEHYDE POLYACETAL CONTAINING COATING

BACKGROUND OF INVENTION

1. Field of Invention

This invention relates to coating compositions. More particularly, this invention relates to melamine formaldehyde cured, coating compositions which give off reduced levels of formaldehyde.

2. Prior Art

In recent years increasing concerns have been expressed about coating compositions which give off formaldehyde during the curing process. Therefore, there has been an emphasis on developing low formaldehyde or formaldehyde-free coatings.

U.S. Pat. Nos. 4,663,410 and 4,674,611, as well as European Patent 201,693 and Chapter 31 of the American Chemical Society, ACS Symposium Series 367, Cross-Linked Polymers, Chemistry, Properties & Applications, disclose the reaction of a polyacetal with an acrylic resin to produce an acetalated acrylic resin which then may be cross-linked by using a polyhydroxy containing monomer.

A second approach disclosed in U.S. Pat. No. 4,655,841 involves the surface curing of a sizing composition by spraying a diacetal onto a polyhydroxylated resin which is based upon polyvinyl alcohol and polyvinyl acetate.

Yet another approach disclosed in the article includes mixing an hydroxyl polymer with a polyacetal and then self-polymerizing the resulting product in situ.

An inherent disadvantage of many of the prior art polyacetal polymers is that they are color formers unless used in the manner described herein. Accordingly, when acetal/OH reactions are carried out using products which do not conform to the chemical structures described herein, undesirable color formation is possible.

Therefore, it is an object of this invention to prepare compositions which give off reduced amounts of formaldehyde when they cure.

It is another object of this invention to prepare coating compositions based upon hydroxy polymers and monomeric polyacetals.

It is a further object of this invention to prepare coatings based upon polyacetal cross-linking agents which do not form undesirably discolored coatings.

These and other objectives are obtained by carrying out the process of the instant invention using the products described herein.

SUMMARY OF INVENTION

Basically, the instant invention involves forming an essentially color-free, low formaldehyde, coating composition by applying a mixture of a polyhydroxy-containing polymer, a hexaalkoxymethylolmelamine, a polyacetal and an acid catalyst to a substrate and curing the coating composition.

DETAILED DESCRIPTION OF INVENTION

The polyhydroxy-containing polymers which may be used in the instant invention may be selected from a wide variety of materials, including conventional, well-known alkyd resins, polyester resins, acrylics, vinyl polymers and copolymers, cellulose acetate based materials and aliphatic hydroxy containing epoxy resins. The key requirement of any of these materials is that they have sufficient reactive aliphatic hydroxyl groups present to enter into a crosslinking reaction with a melamine/formaldehyde resin of the conventional type which is present in conventional amounts.

Alkyd resins, for the most part, are polymers prepared by reactions between fatty acids or alcoholized oils and mono and poly carboxylic acids and possibly other polyols. Polyester resins are similar except that no fatty acids or oil-based materials are made part of the polymer. Regardless of which ingredients are chosen, however, sufficient free aliphatic hydroxyl groups must be present to ensure that the alkyd resin will crosslink and provide a cured solvent-resistant coating.

The acrylic and vinyl polymers and copolymers are prepared generally by copolymerizing acrylic or vinyl monomers in conventional amounts utilizing preferably free radical generating catalysts. As with the alkyd/polyester polymers of the instant invention, it is essential that sufficient hydroxyl groups be present on the polymeric backbone to ensure adequate crosslinking. Hydroxyl groups are generally admitted to polymeric backbone by the use of hydroxy-containing acrylic or vinyl monomers as described hereafter. Among the various monomers which may be utilized to form the acrylic or vinyl polymers are included acrylic and methacrylic acids and their esters, including their hydroxy esters such as hydroxypropyl acrylate or methacrylate and hydroxyethylacrylate or methacrylate, aryl based monomers such as styrene, vinyl toluene, other monomers such as allyl alcohol and a wide variety of other conventional monomers. Monomers which interferingly react with the melamine formaldehyde/hydroxyl crosslinking mechanism or the polyacetal/transetherification reaction should not be utilized.

The cellulosic acid esters are of the type which is well known in the coating, particularly wood coating industry. Particularly preferred are the cellulose acetates and the mixed cellulose acetate carboxylates such as cellulose acetate butyrate. Again, there must be sufficient free and unreacted hydroxyl groups present in the cellulosic polymer to permit crosslinking of the polyhydroxy containing material in question.

The second key ingredient of the low formaldehyde low color coating compositions of the instant invention is an hexaalkoxymethylolmelamine wherein the alkoxy group contains up to about 3 carbon atoms, or mixtures thereof. Preferably the melamine is or is the equivalent of an hexamethoxymethololmelamine of the Cymel 300, 301 family manufactured by American Cyanamid Company. Stating that this material is an hexaalkoxymethylolmelamine does not mean that there are precisely six alkoxy groups on each molecule. Materials in which there are on the average more than five alkoxy groups, i.e., 5.1 up to 6, would qualify as an "hexaalkoxymethylolmelamine" as that term is employed herein.

Another important ingredient of the coating composition of the instant invention is a polyacetal having the general formula:

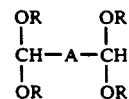

wherein each R may be the same or different and contains from one to three carbon atoms and A is $C_1$-$C_{20}$ alkyl or aryl moiety. It is essential in selecting the polyacetal for use in the instant invention that the A moiety not contain any groups which are interferingly reacting with the acetal transetherification reaction or the melamine/formaldehyde crosslinking reaction. Preferably, the polyacetal is an alkyl polyacetal wherein A contains from 1-10 carbon atoms and the R groups are methyl.

The final crucial ingredient of the composition of the instant invention is an acid catalyst, preferably a sulfonic acid and most preferably paratoluene sulfonic acid.

The various constituents of the composition of the instant invention should be added in the following solids weight percent ranges, the total being 100.

|  | Permitted | Preferred |
|---|---|---|
| Polyhydroxy polymer | 55-80 | 63-75 |
| Hexaalkoxymethylolmelamine | 10-25 | 11-21 |
| Polyacetal | 2-12 | 3-10 |
| Acid Catalyst | 0.25-10 | 2-6 |

The compositions of the instant invention may be modified by the addition of other ingredients typically utilized in coating compositions, particularly in wood coating compositions. Included among such ingredients are conventional amounts of fillers, reinforcing agents, flow, slip and mar control agents and pigments. The only requirement is that none of these ingredients may interferingly react with any of the essential constituents of the instant invention.

The compositions of the instant invention are blended together utilizing conventional blending and agitation methods employed in the coatings industry.

The coating compositions of the instant invention may be applied to any substrate such as wood, metal, plastic and glass, although wood substrates are preferred. The compositions may be used alone or in combination with other sanding coats, sealer coats, primer coats and top coats.

The coating compositions of the instant invention are most useful in clear coating applications where low yellowing is preferred although the same technology can be applied to pigmented coatings of varying opacities and colors.

As pointed out above, the coating compositions of the instant invention find particular utility as wood coating compositions in applications where a reduction in the level of formaldehyde is desired. One of the major goals in the coatings industry, particularly as formaldehyde has been identified by some as an undesirable by-product, has been to eliminate or reduce the amount of formaldehyde which is given off during curing. Formaldehyde is most often generated by crosslinking agents such as urea/formaldehyde and melamine/formaldehyde resins. The coating compositions of the instant invention provide a means whereby the formaldehyde generated by the crosslinking or curing of hexaalkoxymethololmelamine materials can be reduced by 25 percent or more.

At the same time, the coating compositions of the instant invention are particularly useful because they do not exhibit the adverse color forming characteristics typical of compositions which utilize polyacetals as a part of the polymeric backbone.

EXAMPLE 1

A curable coating composition was prepared by agitating the following: 108.2 parts of RJ 100 a styrene allyl alcohol copolymer available from the Monsanto Company, 43.3 parts of Tetronic 901, a reactive polyol (propylene oxide derivative) available from the BASF Wyandotte Corporation, 32.5 parts of Cymel 303, a hexamethoxymethylolmelamine available from the American Cyananide Company, 0.5 parts of Byk 300 a flow and mar control agent available from Byk-Chemie USA, 0.6 parts of Byk 320, another flow control agent, 130.0 parts of toluene, 343.0 parts of xylene, 50.0 parts of butanol, 60.5 parts of butyl acetate, 213.4 parts of Solvesso 100 solvent from the Exxon Co., 10.0 parts of methylamyl ketone and 8.0 parts of 1, 1, 3, 3-tetramethoxypropane. The mixture was catalyzed by adding 2 percent by volume of a 60% by weight paratoluene sulfonic acid solution in a blend of methyl and isopropyl alcohols.

The above-described coating composition was applied by electrostatic disk to kitchen cabinet doors which had been precoated with a conventional vinyl modified alkyd urea formaldehyde sealer which had been applied to a wet film thickness of about 2.3 to about 2.7 mils and allowed to flash for 25 minutes at ambient temperature before being exposed to a bake cycle of 4 minutes at 150of followed by a cool down cycle of 6 minutes at ambient temperature. The sealer coat was sanded and the composition described above was then applied to a wet film thickness of about 3.1 to about 4.3 mils. This coating was allowed to flash for 17 minutes at ambient temperature before baking for 4 minutes at 150° F. followed by a cool down cycle of 14 minutes at ambient temperatures. The resulting coating was evaluated in accordance with ASTM 161:1-1980 along with x-hatch/tapepull adhesion test, a nickel scratch test and a fingernail (leading edge) mar resistance test. Satisfactory coating properties were obtained.

EXAMPLE 2

The following were mixed under agitation: 21.1 parts of xylene, 59.8 parts of Cymel 303 as described in Example 1, 42.0 parts of an isobutylated urea, AM1023 available from Akzo Coatings, Inc., 387.2 parts of a coconut alkyd known as Relrez AL4136E560, which is available from Akzo Coatings, Inc., 3.0 parts of a silica flattening agent, 24.7 parts of 1,1,3,3-tetramethoxypropane and 81.7 parts of isobutanol. The following were added to the above mixture under agitation: 180.1 parts of toluene, 46.0 parts of isopropyl alcohol, 2.0 parts of a mar control additive and 0.5 parts of Byk 300 as described in Example 1. After mixing the above, 149.4 parts of a 20% solution in toluene/isobutanol/methylisobutylketone of Eastman Chemical Products, Inc.'s CAB 553-04 and 0.16 parts of a silica flattening agent were added. Prior to application, a PTSA solution was added at a level of 4% PTSA on coating vehicle solids.

The above-described coating composition was applied by air assisted airless spray to kitchen cabinet doors which had been precoated with a sealer containing tetramethoxypropane. The tetramethoxypropane sealer was comprised of 4.82 parts of the isobutylated urea AM1023 described above, 16.5 parts of the Cymel 303, described above, 50.61 parts of the coconut alkyd Relrez AL4136E560 described above, 21.5 parts of the CAB 553-04 described above, 6.09 parts of 1,1,3,3-tetramethoxypropane, 0.81 part of a polypropylene wax, 0.01 part of a silica flattening agent, and 0.01 part of a defoamer. The sealer was applied to a wet film thickness of about 4.0 to about 5.0 mils and allowed to flash for 9 minutes at ambient temperature before being exposed to a bake cycle of 3 minutes at 98°-110° F. and then to a bake cycle of 2.25 minutes at 170° F. followed by a cool down cycle of 8.25 minutes at ambient temperature. The sealer coat was sanded and the composition described above was then applied to a wet film thickness of about 5.0 to about 7.0 mils. This coating was allowed to flash for 12 minutes at ambient temperature before being exposed to a bake cycle of 9.75 minutes at 97° F. and then a bake cycle of 2.25 minutes at 155° F. followed by a cool down cycle at ambient temperature. Satisfactory coating properties were obtained.

EXAMPLE 3

Example 2 was repeated except that no cellulose acetate butyrate was added to the mixture. Satisfactory coating properties were obtained.

EVALUATION

The compositions of the instant invention, which were applied to kitchen cabinet doors and then cured, exhibited a 35-52 percent reduction in the emission of formaldehyde during application and curing, compared to conventional prior art wood coating compositions as monitored by a Bucharach TWA-lot number 5072T over a four-hour period at ambient temperature and a relative humidity of about 63%.

We claim:

1. A coating composition comprising the reaction product of a polyhydroxy-containing polymer, an hexaalkoxymethylolmelamine wherein the alkoxy group is $C_1$-$C_3$, or mixtures thereof, a polyacetal having the general formula:

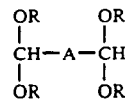

wherein R is $C_1$-$C_3$ alkyl, or mixtures thereof, and A is selected from alkyl and aryl groups having from 1-20 carbon atoms and no other groups interferingly reactive with the acetal transetherification reaction or the melamine crosslinking reaction and an acid catalyst.

2. The coating composition of claim 1 wherein the polyhydroxy-containing polymer is selected from vinyl polymers, alkyds, polyesters, and cellulosic esters, containing unreacted aliphatic hydroxyl groups.

3. The coating composition of claim 1 wherein R is $CH_3$ and A is $C_1$-$C_{10}$ alkyl.

4. The coating composition of claim 3 wherein the polyhydroxy-containing polymer is a styrene ally alcohol copolymer.

5. The coating composition of claim 1 wherein the hexaalkoxymethylolmelamine is an hexamethoxymethylolmelamine.

6. The coating composition of claim 1 wherein the acid catalyst is a sulfonic acid.

7. The coating composition of claim 6 wherein the acid catalyst is paratoluene sulfonic acid.

* * * * *